(12) United States Patent
Ardö et al.

(10) Patent No.: US 11,640,680 B2
(45) Date of Patent: May 2, 2023

(54) IMAGING SYSTEM AND A METHOD OF CALIBRATING AN IMAGE SYSTEM

(71) Applicant: Axis AB, Lund (SE)

(72) Inventors: Håkan Ardö, Lund (SE); Mikael Nilsson, Lund (SE); Karl Erik Åström, Lund (SE); Martin Ahrnbom, Lund (SE)

(73) Assignee: Axis AB, Lund (SE)

( * ) Notice: Subject to any disclaimer, the term of this patent is extended or adjusted under 35 U.S.C. 154(b) by 106 days.

(21) Appl. No.: 17/111,571

(22) Filed: Dec. 4, 2020

(65) Prior Publication Data

US 2021/0233276 A1    Jul. 29, 2021

(30) Foreign Application Priority Data

Jan. 24, 2020   (EP) .................................... 20153667

(51) Int. Cl.
*G06T 7/80* (2017.01)
*G06T 7/73* (2017.01)
*G06T 7/70* (2017.01)
*G01C 3/02* (2006.01)

(52) U.S. Cl.
CPC .............. *G06T 7/85* (2017.01); *G01C 3/02* (2013.01); *G06T 7/70* (2017.01); *G06T 7/73* (2017.01); *G06T 2207/10012* (2013.01)

(58) Field of Classification Search
None
See application file for complete search history.

(56) References Cited

U.S. PATENT DOCUMENTS

| 8,433,187 | B2* | 4/2013 | Cohen | H04N 23/67 |
|---|---|---|---|---|
| | | | | 396/125 |
| 9,369,689 | B1 | 6/2016 | Tran et al. | |
| 9,674,504 | B1* | 6/2017 | Salvagnini | G06V 10/44 |
| 10,186,051 | B2* | 1/2019 | Brücker | G01P 5/22 |
| 10,546,385 | B2* | 1/2020 | Indelman | G06F 18/22 |

(Continued)

FOREIGN PATENT DOCUMENTS

| CN | 102774325 B | 12/2014 |
|---|---|---|
| CN | 106910222 A | 6/2017 |

(Continued)

OTHER PUBLICATIONS

STIC Machine Translation of JP-4147059-B2 (Year: 2004).*

(Continued)

*Primary Examiner* — Tyler W. Sullivan
(74) *Attorney, Agent, or Firm* — Volpe Koenig

(57) ABSTRACT

An imaging system is described having at least three cameras and a processing unit. The at least three cameras have a common field of view and camera centres positioned along a line. The at least three cameras are configured to image a calibration object to generate a set of calibration object images, wherein the calibration object is located nearby the at least three cameras and in the common field of view. The at least three cameras are further configured to image a scene comprising a set of distant scene position points to generate a set of position point images. The processing unit is configured to generate a set of calibration parameters in dependence on the set of calibration object images and the set of position point images.

10 Claims, 8 Drawing Sheets

(56) References Cited

U.S. PATENT DOCUMENTS

| | | | |
|---|---|---|---|
| 2005/0270375 A1* | 12/2005 | Poulin | G01B 11/2504 |
| | | | 348/187 |
| 2012/0002057 A1* | 1/2012 | Kakinami | G06T 7/85 |
| | | | 348/E17.002 |
| 2016/0180510 A1* | 6/2016 | Grau | G06T 7/85 |
| | | | 348/46 |
| 2017/0094251 A1* | 3/2017 | Wolke | G06T 7/593 |
| 2018/0300900 A1 | 10/2018 | Wakai et al. | |
| 2018/0300901 A1* | 10/2018 | Wakai | G06T 7/73 |
| 2019/0073795 A1* | 3/2019 | Matsuzawa | G06T 7/80 |
| 2019/0082156 A1 | 3/2019 | Zhang et al. | |
| 2019/0082173 A1* | 3/2019 | Schilling | G06T 15/06 |
| 2019/0295291 A1* | 9/2019 | Raag | G06T 7/85 |

FOREIGN PATENT DOCUMENTS

| | | | | |
|---|---|---|---|---|
| CN | 108053450 A | 5/2018 | | |
| CN | 110378969 A | 10/2019 | | |
| EP | 1378790 A2 * | 1/2004 | | G01C 11/06 |
| EP | 1378790 B1 * | 12/2007 | | G01C 11/06 |
| JP | 4147059 B2 * | 9/2008 | | G01C 11/06 |
| WO | 03/104838 A1 | 12/2003 | | |

OTHER PUBLICATIONS

F. Pedersini, A. Sarti and S. Tubaro, "Multi-camera systems," in IEEE Signal Processing Magazine, vol. 16, No. 3, pp. 55-65, (May 1999).

L. Lee, R. Romano and G. Stein, "Monitoring activities from multiple video streams: establishing a common coordinate frame," in IEEE Transactions on Pattern Analysis and Machine Intelligence, vol. 22, No. 8, pp. 758-767, (Aug. 2000).

Timo Kropp, "Five methods to calibrate overlapping surveillance cameras," (2012).

Y. Uematsu, T. Teshima, H. Saito and C. Honghua, "D-Calib: Calibration Software for Multiple Cameras System," 14th International Conference on Image Analysis and Processing (ICIAP 2007), Modena, pp. 285-290, (2007).

R. Tsai, "A versatile camera calibration technique for high-accuracy 3D machine vision metrology using off-the-shelf TV cameras and lenses," in IEEE Journal on Robotics and Automation, vol. 3, No. 4, pp. 323-344, (Aug. 1987).

Z. Zhang, "A flexible new technique for camera calibration," in IEEE Transactions on Pattern Analysis and Machine Intelligence, vol. 22, No. 11, pp. 1330-1334, (Nov. 2000).

Extended European Search Report dated Jul. 16, 2020 for the European Patent Application No. 20153667.9.

* cited by examiner

IMAGING SYSTEM AND A METHOD OF CALIBRATING AN IMAGE SYSTEM

TECHNICAL FIELD

Embodiments relate to calibration of an imaging system. Especially, embodiments described herein relate to the calibration of an imaging system comprising at least three cameras having a common field of view.

BACKGROUND

Traffic surveillance and analysis within cities is an important and growing technology field. Traditional monocular and stereo vision cameras are commonly used and provide a large amount of data about the traffic flow. The more views of a scene that are available, the more geometric data can be extracted which allows for more detailed analysis and estimations.

One approach for imaging traffic that combines practical aspects and data quality may be a trinocular camera array, a camera rig with three cameras, providing more data than a traditional stereo camera rig, while being just as easy to mount. Compared to a stereo camera, the trinocular camera array generates more images with different perspectives, and therefore can provide more geometric data. A calibration process is necessary to set up a trinocular camera array, that finds both the rectification and the orientation of the camera rig, as well as internal orientation, such as the accurate distance between the cameras. Two commonly used approaches are those by Tsai (Tsai, R. Y. (1987). A versatile camera calibration technique for high-accuracy 3d machine vision metrology using off-the-shelf tv cameras and lenses. IEEE J. Robotics and Automation, 3:323-344) and Zhang (Zhang, Z. (2000). A flexible new technique for camera calibration. IEEE Transactions on Pattern Analysis and Machine Intelligence, 22:1330-1334. MSR-TR-98-71, Updated Mar. 25, 1999), each relying on a single type of external data source: known 3D points in an imaged scene (and their corresponding 2D positions in the images) in the former and controlled checkerboard patterns in the latter. A 2D point is a point in a two-dimensional space and its position is given by two Cartesian coordinates. Correspondingly, a 3D point is a point in a three-dimensional space and its position is given by three Cartesian coordinates. A common strategy used by traffic researchers is to use a variant of Tsai's calibration method, which calibrates the cameras using only measured 3D points in an imaged scene. This approach does not take into account the particular geometry of the trinocular camera array and instead calibrates each camera individually. Because all the 3D point data correspond to positions far from the camera, there is a risk that an incorrect calibration is found. Another commonly used approach is to calibrate using only checkerboards. This approach may result in calibration data that perform badly at distances too far from the cameras, where checkerboards are impractical to place or are of too low resolution to correctly resolve.

Therefore, what is needed is a calibration technique for a camera array with three or more cameras that avoids pitfalls of standard calibration techniques.

SUMMARY OF THE INVENTION

A first aspect of the disclosure is a method of calibrating an imaging system, the imaging system comprising at least three cameras having a common field of view, wherein each of the at least three cameras has a camera centre, and wherein the camera centres are positioned along a line, the method comprising: imaging a calibration object with the at least three cameras to generate a set of calibration object images, wherein the calibration object is located nearby the at least three cameras and in the common field of view, generating a set of first parameters by processing the set of calibration object images, imaging a set of distant scene position points with the at least three cameras to generate a set of position point images, generating a set of second parameters by processing the set of position point images, and generating a set of calibration parameters in dependence on the set of first parameters and the set of second parameters.

An advantage with embodiments disclosed herein is a simplified and improved calibration procedure.

Another advantage with embodiments disclosed herein is that thanks to the calibration procedure, depth measurement may be performed with increased precision in images acquired by the imaging system.

Optionally, the set of calibration parameters is generated in dependence on the set of first parameters, the set of second parameters, and an axiom that each camera centre is positioned along the line being a straight axis. The axiom that the camera centres are exactly on a straight line gives a virtual camera setup exactly on the straight line, which has the advantage of allowing rectification and efficient depth estimations of imaged points when the real camera set up is on the straight line. Having all the cameras on a straight line is a requirement for joint rectification of more than two cameras. When all cameras are rectified jointly, depth estimations of imaged points become more efficient, as the disparities between points in the different cameras can be efficiently computed in a search. The search is performed along the x-axis and therefore utilizes computer cache memory and computational resources more efficiently.

The set of calibration parameters may be generated in dependence on the set of first parameters, the set of second parameters, and a minimization of an estimated distance of each camera centre from the straight axis. This has the advantage of finding calibration parameters that are optimized for the real camera set up, wherein the cameras are arranged with the camera centres almost along a straight line, i.e. wherein the cameras are arranged with the camera centres with small deviations from the straight axis.

Optionally, a spacing between adjacent pairs of the camera centres varies. This has the advantage of enabling precise depth measurements at both short distances and long distances since the two adjacent cameras arranged close to each other provide accurate depth measurements at short distances and the two adjacent cameras arranged at a larger spacing provide accurate depth measurements at larger distances. In some examples, depth measurements may be made using a non-adjacent pair of cameras.

Optionally, the set of calibration parameters comprises at least one of: a set of distances between the camera centres, a position of the imaging system, a rotation of the imaging system, a position of the calibration object corresponding to at least one of the calibration object images, and a rotation of the calibration object corresponding to at least one of the calibration object images.

The step of generating a set of first parameters may comprise determining a set of radial distortion parameters and/or tangential distortion parameters from the calibration object images. The step of generating the set of first parameters may further comprise determining a set of intrinsic parameters for cameras from the calibration object images.

The step of generating the set of first parameters may further comprise determining a set of rectification parameters for cameras from the calibration object images. Thanks to the determined set of parameters artefacts in images taken by the cameras may be corrected.

By the term 'distortion' when used in this description is meant deviation from a rectilinear projection, i.e. a deviation from a projection in which straight lines in a scene remain straight in an image. It is a form of optical aberration.

By the term 'intrinsic parameters' when used in this description is meant parameters such as focal length, image sensor format, and principal point.

By the term 'rectification' when used in this description is meant rectification of an image. The rectification is a transformation process used to transform the images to share all horizontal axes, or, more technically, to have horizontal epipolar lines. It may be used in computer stereo vision to find matching points between images.

Optionally, the set of second parameters may be generated in dependence on the set of position point images and the set of first parameters. A set of initial positions estimates for the at least three cameras may be determined. A set of optimized positions estimates for the at least three cameras may then be determined. This provides the advantage of reducing the risk that joint optimizations (described below) get stuck in local minima or suffer from slow convergence.

The step of generating the set of calibration parameters may comprise determining a set of jointly optimized positions comprising a position and a rotation for each of the at least three cameras, wherein the jointly optimized positions are determined according to a regression analysis in dependence on the set of first parameters and the set of second parameters. This has the advantage of providing a solution that is as consistent as possible with all available calibration data, both near and far from the cameras.

Another aspect of the disclosure is an imaging system comprising: at least three cameras having a common field of view, wherein each of the at least three cameras having a camera centre, and wherein the camera centres are positioned along a line, the at least three cameras being configured to: image a calibration object to generate a set of calibration object images, wherein the calibration object is located nearby the at least three cameras and in the common field of view, and image a scene comprising a set of distant scene position points to generate a set of position point images, and a processing unit configured to generate a set of calibration parameters in dependence on the set of calibration object images and the set of position point images. This has the advantage of providing an improved calibration procedure that enables that depth measurement may be performed with increased precision in images acquired by the imaging system.

The imaging system may further comprise a housing wherein the at least three cameras are located in the housing. Alternatively, at least one of the at least three cameras may be configured to be located separately from the remaining cameras.

Another aspect of the disclosure is a method of installing an imaging system, the imaging system having at least three cameras having a common field of view, wherein each of the at least three cameras having a camera centre, and wherein the camera centres are positioned along a line, comprising: installing the imaging system at a fixed location, controlling the imaging system to capture one or more images of a calibration object, wherein the calibration object is located nearby the at least three cameras and in the common field of view, controlling the imaging system to capture one or more images of a scene comprising a set of distant scene position points, providing the imaging system with a set of position data corresponding to the set of scene position points, controlling the imaging system to generate a set of calibration parameters in dependence on the images of the calibration object, images of the scene, and the set of position data. This has the advantage of providing a faster and more convenient installation procedure with an improved calibration precision.

BRIEF DESCRIPTION OF THE DRAWINGS

Other features and advantages of the present invention will become apparent from the following detailed description of an example, with reference to the accompanying drawings, in which.

DESCRIPTION

Figure 1:
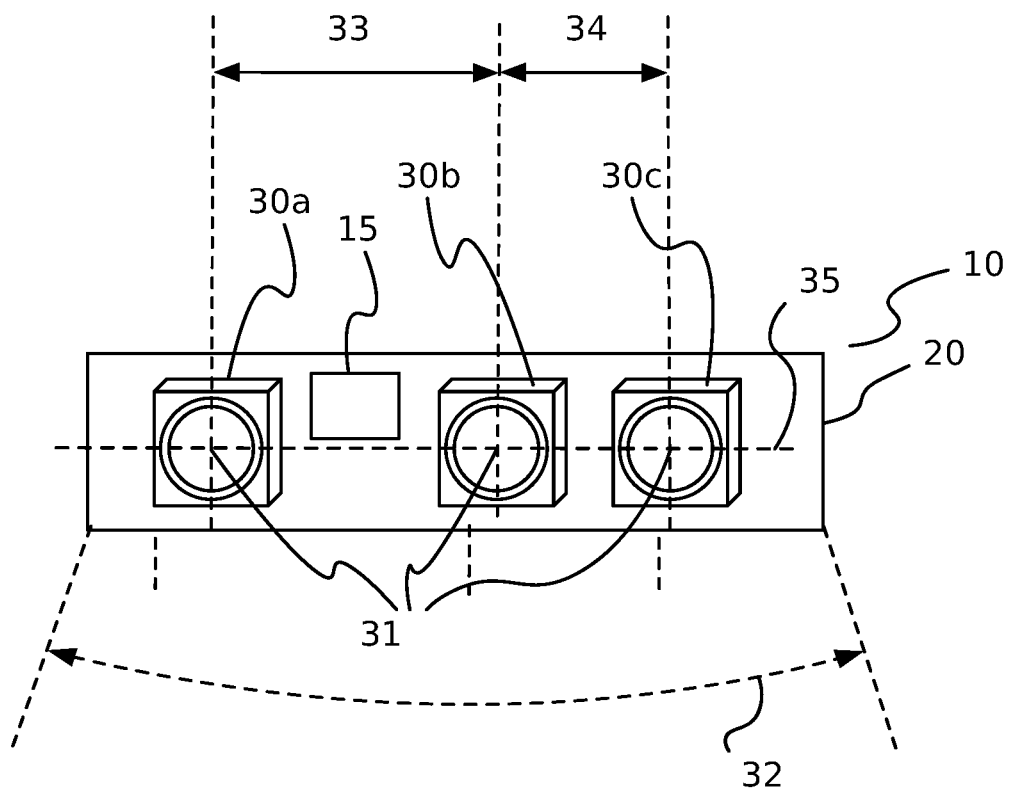
FIG. 1 is diagram of a trinocular imaging apparatus according to an aspect of the description.

The present description relates to apparatuses and techniques for providing improved object detection using camera arrays. Throughout the description, the same reference numerals are used to identify corresponding elements.

FIG. 1 is a diagram of an imaging system 10 according to an aspect of the description. The imaging system 10 comprises at least three cameras. In the example of FIG. 1, the three cameras are labelled 30a, 30b, and 30c. The examples provided in the present description predominantly focus on three camera configurations. However, the apparatus and methods disclosed herein may be scaled to imaging systems comprising four, five, six, or more cameras without any known limitation.

Each of the cameras 30a-c comprises a lens configuration with an 'optical centre' or camera centre 31. Each of the cameras 30a-c is arranged so that they have a substantially common field of view 32. i.e. so that an object or scene can be within the field of view of each camera 30a-c simultaneously. By the expression substantially common field of view is meant that the cameras 30a-c are arranged so that they have substantially overlapping fields of view. Furthermore, the cameras 30a-c are arranged such that the camera centre 31 of each camera 30a-c is positioned along a straight axis 35. However, it should be understood that the camera centres 31, due to e.g. small deviations when mounted as a camera array, may not be exactly positioning along the straight axis 35, even if it assumed that they are positioned along the straight axis 35. As will be described in more detail below, a calibration process is necessary to set up a trinocular camera array, that finds both the rectification and the orientation of the imaging system 10, as well as internal orientation such as accurate distances between the individual cameras 30a-c. Further and as described in this disclosure, the small deviations of the camera centres 31 from the straight axis 35 may be determined in the calibration process. To perform this calibration process, having three cameras 30a-c on a straight line is an advantage over a stereo camera, because it provides an additional constraint (as compared to the stereo camera, which is always on some straight line).

In one example, a spacing between adjacent pairs of the camera centres 31 varies, i.e. a first camera spacing 33 between a first camera 30a and second camera 30b is smaller or larger than a second camera spacing 34 between a second camera 30b and third camera 30c. For example, the first camera spacing 33 may be in the range of 10 cm to 30 cm and the second camera spacing 34 may be in the range of 5 cm to 15 cm, just to give some examples.

In one example, all of the cameras 30a-c are co-located within a housing 20. Locating all the cameras 30a-c in a single housing 20 enables a simplified installation, where only one housing 20 needs to be installed at a site. In another example, at least one of the cameras 30a-c is arranged to be located separately from the remaining cameras 30a-c, i.e. at a different location while still maintaining a substantially common field of view 32 with the remaining cameras 30. This configuration provides better geometric data, but the mounting and calibration process may be more time consuming and complex.

In an example, the imaging system 10 further comprises a processing unit 15 configured to receive imaging data generated by the cameras 30a-c and perform image analysis and parameter generation according to the following description. The processing unit 15 may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, the processing unit 15 may serve as one element/means when executing one instruction but serve as another element/means when executing another instruction. In addition, one element/means may be implemented by one instruction in some cases, but by a plurality of instructions in some other cases. Naturally, it is conceivable that one or more elements (means) are implemented entirely by analogue hardware components.

The processing unit 15 may include one or more processing units, e.g. a CPU ("Central Processing Unit"), a DSP ("Digital Signal Processor), an ASIC ("Application-Specific Integrated Circuit), discrete analog and/or digital components, or some other programmable logical device, such as an FPGA ("Field Programmable Gate Array"). The device may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory.

The special-purpose software, the exclusion data, the reference values, and any other data needed during execution, may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The processing unit 15 may include one or more communication interfaces, such as a serial interface, a parallel interface, a USB interface, a wireless interface, a network adapter, etc., as well as one or more data acquisition devices, such as an ND converter. The special-purpose software may be provided to the processing unit 15 on any suitable computer-readable medium, including a record medium, and a read-only memory.

Figure 2:
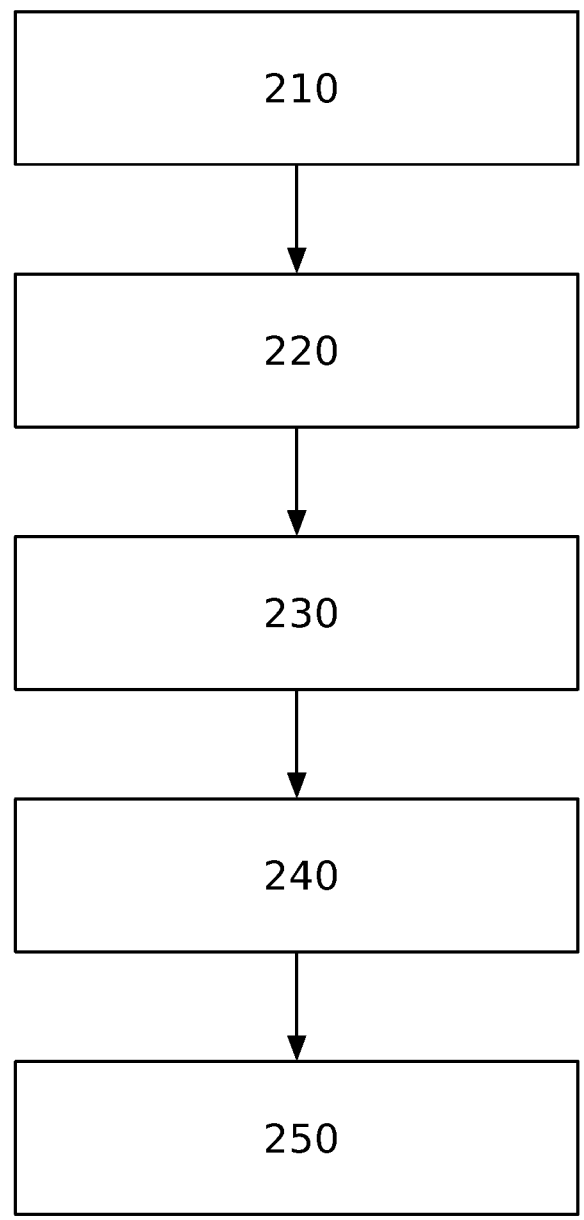
FIG. 2 is a flowchart of the imaging processing method sequence according to one aspect of the description.
Figure 3:
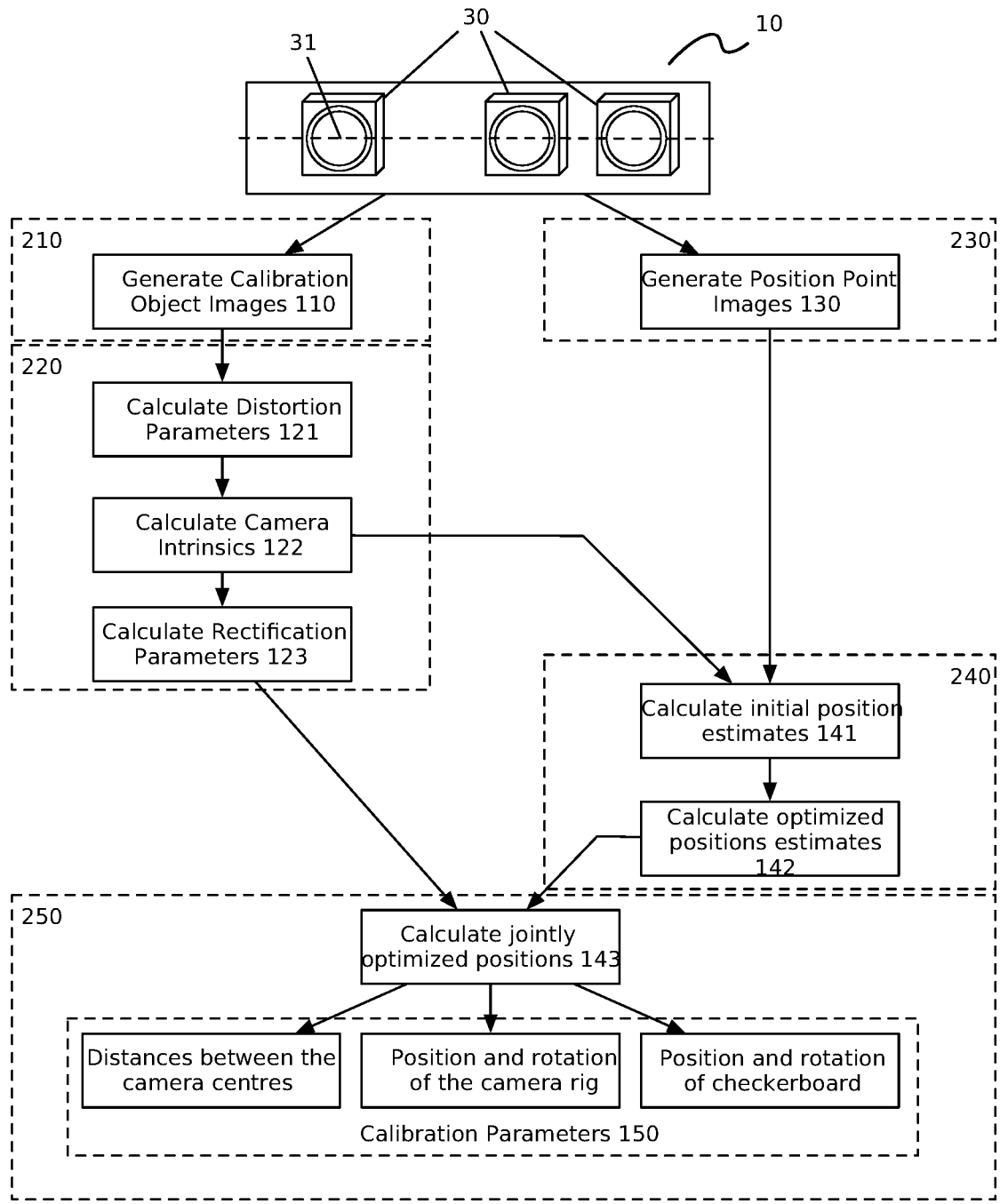
FIG. 3 is a flowchart of the imaging processing method according to an aspect of the description.
Figure 4:
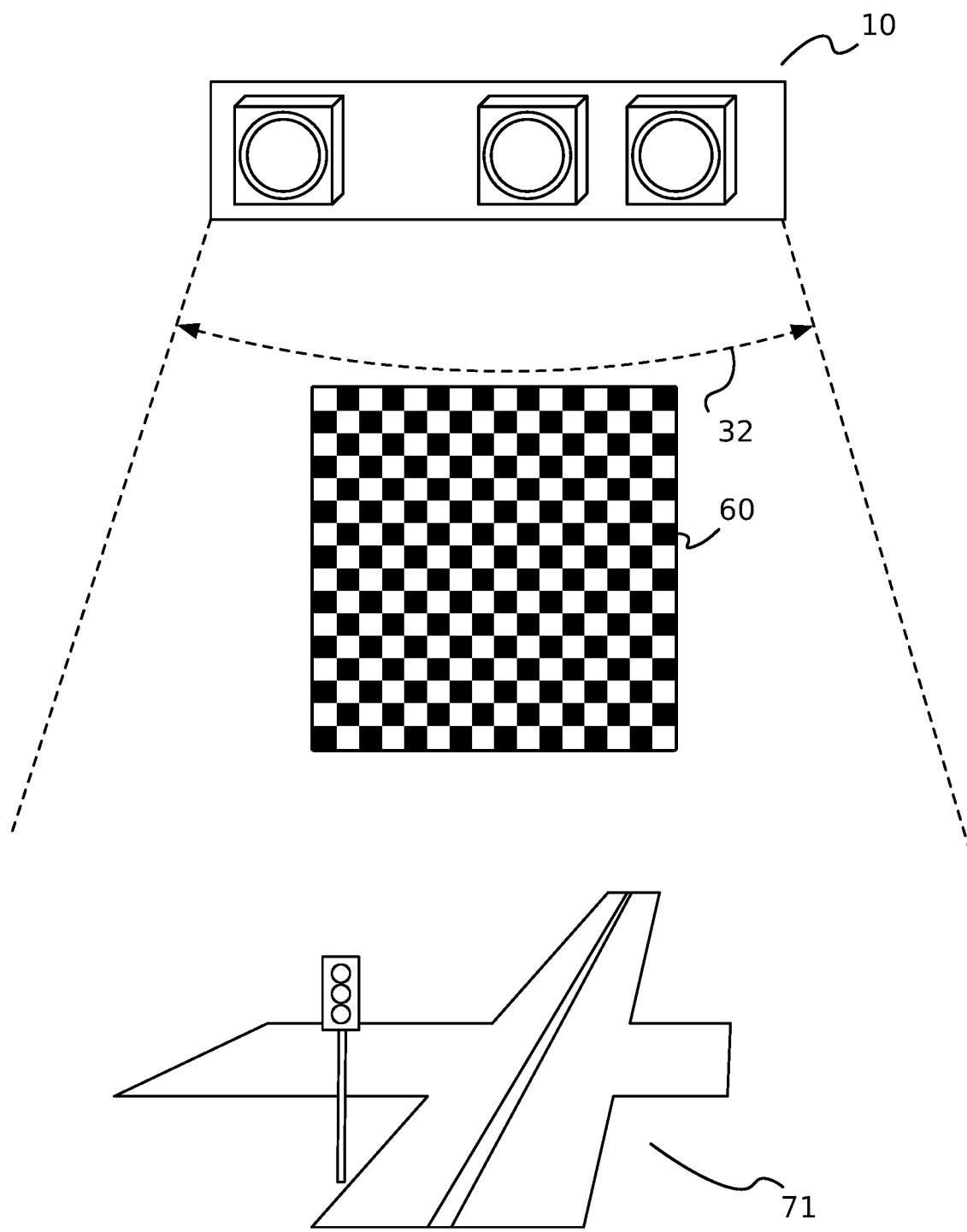
FIG. 4 is diagram of an imaging apparatus and a calibration object within a field of view according to an aspect of the description.

FIG. 2 is a flowchart of the calibration sequence according to one example of the description. FIG. 3 provides a more detailed example of the calibration sequence including the order of data flow within the calibration sequence. FIG. 4 is a diagram of imaging system 10 and a calibration object 60 within the common field of view 32 of the cameras 30.

In step 210, the cameras 30 of the imaging system 10 are imaging a calibration object 60 to generate a set of images (i.e. calibration object images 110) each showing the calibration object 60. Imaging system 10 may be installed in a fixed position, e.g. on a post or building and directed towards a scene 71. In one example, imaging system 10 is installed in an elevated position, between 5 and 10 metres above the ground. In this example, scene 71 may comprise a set of objects (e.g. a road and a sidewalk) arranged at ground level. In one example, the distance of a set of objects in a scene 71 (and corresponding scene position points 70, cf. FIG. 5) may be at least 2 metres from the imaging system 10 and are defined as being 'distant' from the imaging system 10 in the description below. Preferably, the objects of scene 71 are at least 10 metres from imaging system 10.

The calibration object 60 may be a checkerboard or similar high contrast object with a known set of dimensions and a set of positions (e.g. corners) on the calibration object 60 that are easy to locate in a 2D image of the calibration object 60 via known automatic image processing. Positioning the calibration object 60 in front of the imaging system 10 for step 210 may be done in a temporary manner and may be as simple as holding it up by hand. Step 210 may be repeated a number of times while varying the position of the calibration object 60 with respect to the imaging system 10 in order to generate a larger set of calibration object images 110 useful for the processing steps described below. For example, the calibration object 60 may be placed in front of the imaging system 10 in several different rotations and positions. The calibration object 60 will be positioned closer to the imaging system 10 during calibration step 210 than at least some of the objects of scene 71. The calibration object 60 may be positioned within 10 metres from imaging system 10 during step 210, wherein it is described as being 'nearby' in the description below. Preferably, calibration object 60 is positioned within 2 metres from imaging system 10 during step 210.

In step 220, a set of first parameters 121, 122, 123 is generated by processing the set of calibration object images 110. The processing unit 15 determines the set of first parameters 121, 122, 123.

First, a set of distortion parameters are generated from the calibration object images 110 to determine a set of radial distortion parameters 121 and/or tangential distortion parameters 121 for cameras 30. In one example, the following technique is used to determine a set of radial distortion parameters 121 and tangential distortion parameters 121 from calibration object images 110. Where the calibration object 60 is a checkerboard, a corner detector is applied to the calibration object images 110 of the checkerboard in all three cameras 30. Points belonging to what are supposed to be straight lines are identified using some standard method, for example using x-corner detection followed by checkerboard structure recovery. The parameters $\alpha_1$, $\alpha_2$, $\beta_2$, $x_c$ and $y_c$ are optimized for the distortion model $$x_u = x_c + \frac{x_r}{1 + \alpha_1 r^2 + \alpha_2 r^4} + \beta_1(r^2 + 2x_r^2) + 2\beta_2 x_r y_r$$

$$y_u = y_c + \frac{y_r}{1 + \alpha_1 r^2 + \alpha_2 r^4} + 2\beta_1 x_r y_r + \beta_2(r^2 + 2y_r^2)$$

where $(x_u, y_u)$ are the undistorted coordinates, $(x_c, y_c)$ are the centre of distortion, $(\alpha_1, \alpha_2)$ are radial distortion parameters 121a and $(\beta_1, \beta_2)$ are tangential distortion parameters 121b, while the original, distorted, pixel coordinates $(x_d, y_d)$ are given by $x_r = x_d - x_c$ and $y_r = y_d - y_c$, and $r = \sqrt{x_r^2 + y_r^2}$. The optimization tries to find parameters that straighten the lines via the Nelder-Mead algorithm. The loss for straightening the lines is a total least squares line fitting per line. Once the optimal parameters are found, finding $(x_d, y_d)$ given $(x_u, y_u)$ can be done by solving a depressed quartic as a starting point, and then optimizing with fixed point iterations.

Second, a set of intrinsic parameters 122 are generated from the calibration object images 110 for the cameras 30. In one example, the following technique is used to determine a set of intrinsic parameters 122 from the calibration object images 110. Using the method presented by Zhang the intrinsic parameters 122 are found individually for each camera 30. The points on the checkerboard are converted to undistorted coordinates, using the above radial distortion parameters 121 and tangential distortion parameters 121, prior to the computation. The non-rectified intrinsic camera matrices $K_i^0$ (where i is the index for each camera) were parametrized as $$K_i^0 = \begin{bmatrix} f_i \times \gamma_i & s_i & c_{i,x} \\ 0 & f_i & c_{i,y} \\ 0 & 0 & 1 \end{bmatrix}$$

where $f_i$ is the focal length, $\gamma_i$ is the aspect ratio, $S_i$ is the skew and $(c_{i,x}, c_{i,y})$ is the principal point.

Third, a set of rectification parameters 123 are generated from the calibration object images 110 for cameras 30. In one example, the following technique is used to determine a set of rectification parameters 123 from calibration object images 110. The distortion-free images are rectified as follows:

An optimization is performed to find rectification parameters 123 (or homographies $H_i$), which comprise the rotations of the cameras 30, as well as focal length adjustment parameters $\alpha_i$, such that the y coordinates of all corresponding 2D points are substantially matching after applying the homographies $H_i$, defined as $$H_i = K \times R_i \times \widetilde{K_i}^{-1}$$

$$\overline{K_i} = \begin{bmatrix} f_i \times \gamma_i \times 3^{\alpha_i} & s_i & c_{i,x} \\ 0 & f_i^{\alpha_i} & c_{i,y} \\ 0 & 0 & 1 \end{bmatrix}$$

where $R_i$ is a rotation matrix. The homographies $H_i$ are then used to create a set of rectified images, where the distortion has been removed using the set of radial distortion parameters 121 and tangential distortion parameters 121 and the same intrinsic matrix K applies to the cameras in all images. The found intrinsic matrix has the form $$K = \begin{bmatrix} f \times 3^\alpha & 0 & c_x \\ 0 & f \times 3^\alpha & c_y \\ 0 & 0 & 1 \end{bmatrix}$$

where the common $\alpha$ is 1. $\alpha$ may be optimized as described below.

The set of first parameters 121, 122, 123 may comprise at least one of the set of radial distortion parameters 121, the tangential distortion parameters 121, the set of intrinsic parameters 122, and the set of rectification parameters 123.

Figure 5:
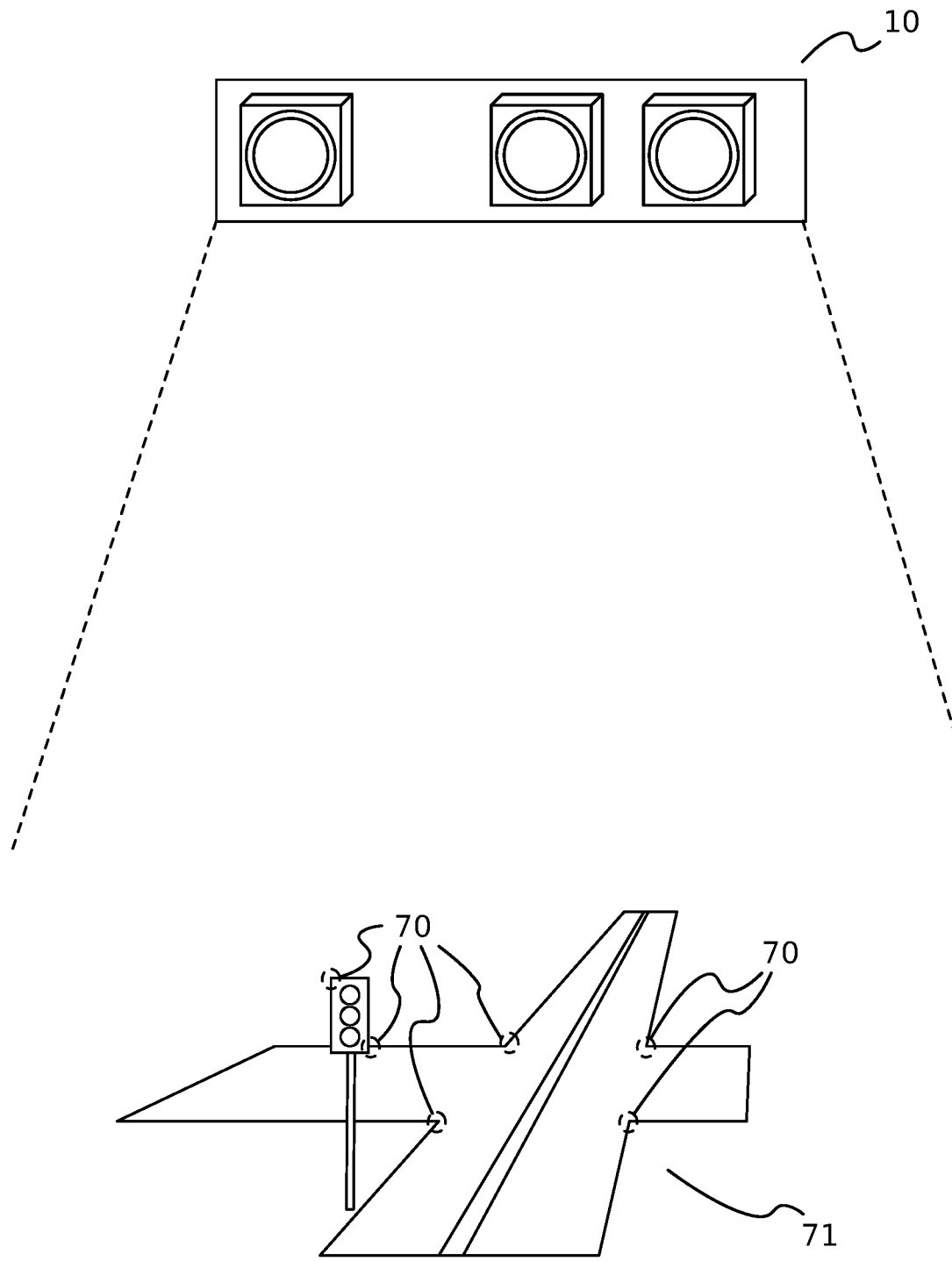
FIG. 5 is diagram of an imaging apparatus and a scene within a field of view of the imaging apparatus according to an aspect of the description.

In step 230, the cameras 30 of the imaging system 10 are imaging a set of distant scene position points 70 to generate a set of images (i.e. position point images 130) each depicting the scene 71. FIG. 5 is diagram of the imaging system 10 and the scene 71 within the common field of view 32 of the cameras 30. As described above, the scene 71 may comprise a set of objects (e.g. a road and a sidewalk). Step 230 may be repeated a number of times in order to generate a larger set of position point images 130 useful for the processing steps described below.

As part of step 230, position data 72 are provided to imaging system 10. The position data comprise a set of scene position points 70 describing a 3D position of a point in the scene 71 (e.g. a position on one or more of the set of objects in scene 71) as well as a corresponding 2D position within each of the position point images 130. This may be carried out using traditional techniques, such as surveying measurements carried out using electronic/optical instruments, e.g. total stations.

In step 240, a set of second parameters 130, 141, 142 are generated by processing the set of position point images 130. The processing unit 15 determines a set of second parameters 130, 141, 142.

First, a set of initial extrinsic parameters is generated from the position point images 130 and from the set of first parameters 121, 122, 123 to determine a set of initial positions estimates 141 for each of the cameras 30 (i.e. initial estimates $P_i$ and $T_j$). In one example, the following technique is used to determine the initial positions estimates 141. Using the measured 3D position of scene position points 70 as well as the new intrinsics K, a rotation R and a translation $t_2$ for the camera 30b (i.e. the middle one) is found via Direct Linear Transformation (DLT) such that the camera equation $$\lambda x = K[Rt_2]X$$

substantially holds for each 2D point x and the corresponding 3D point X in homogeneous coordinates, for some constant $\lambda$. Afterwards, the two outer cameras (e.g. 30a and 30c) are found by identifying the horizontal axis as the first row of R and moving in that direction by the approximately known distances to the outer cameras, by $$C_2 = -R^T \times t_2$$

$$P_1 = K[R, -R \times (C_2 + d_{2,1} R_1)]$$

$$P_2 = K[R, -R \times C_2]$$

$$P_3 = K[R, -R \times (C_2 - d_{2,3} R_1)]$$

where $d_{2,1}$ and $d_{2,3}$ are the approximate distances between cameras 30b and 30a, and 30b and 30c, respectively. $C_2$ is the camera centre 31 of the camera 30b and $R_1$ is the first row of the rotation matrix R.

Then, the 2D corner points of the checkerboards u are triangulated into 3D points $U_{jk}'$ using the new cameras $P_i=K[R\ t_i]$ (where the index i denotes which camera, j denotes which checkerboard orientation and k denotes which corner on the checkerboard). This triangulation is performed using DLT. The 3D points of the checkerboards in the coordinate system of the plane itself, $U_k$, are known. In this plane, z=0 for all the corner points, while the x and y positions are given by the square grid of known distances. A 4×4 transform $$T_j = \begin{bmatrix} R_j & t_j \\ 0 & 1 \end{bmatrix}$$

is computed so that, approximately, $U_{j,k}'=T_j U_k$, for each plane position j.

Second, a set of preliminarily fine-tuned extrinsic parameters is generated from the initial positions estimates 141 to determine a set of optimized positions estimates 142 for each of the cameras 30. In one example, the following technique is used to determine the optimized positions estimates 142. Using the initial positions estimates 141 (i.e. $P_i$ found above) as an initial point, Levenberg-Marquardt optimization is performed using the measured 3D points $V_1$ and their corresponding 2D points $v_{il}$, where the index l denotes which point. Assuming the end residuals will belong to a Gaussian distribution, the maximum likelihood estimate is computed as the sum of squares of residuals of the form $$\text{res}_x=(P_i V_l)_x/(P_i V_l)_z-(v_{il})_x/(v_{il})_z$$

$$\text{res}_y=(P_i V_l)_y/(P_i V_l)_z-(v_{il})_y/(v_{il})_z$$

and the optimization is performed over the parameters α, R (in Euler angles) and $t_2$.

The set of second parameters 130, 141, 142 comprises at least one of the set of position point images 130, the set of initial positions estimates 141, and the set of optimized positions estimates 142.

In step 250, a set of calibration parameters 150, comprising jointly optimized final extrinsic parameters, is generated in dependence on the set of first parameters 121, 122, 123 and the set of second parameters 130, 141, 142. Further, the set of calibration parameters 150 may be generated in dependence on an axiom that each camera centre is positioned along the line being a straight axis 35. The processing unit 15 determines a set of calibration parameters 150 for cameras 30.

First, the processing unit 15 determines a set of jointly optimized positions 143 from the optimized position estimates 142, i.e. from the second set of parameters 130, 141, 142, and the first rectification parameters 123, i.e. from the first set of parameters 121, 122, 123. In one example, a regression analysis is used to determine the jointly optimized positions 143 in dependence on the optimized position estimates 142, first rectification parameters 123, and an axiom that each camera centre 31 of the cameras 30 is positioned along the line being a straight axis 35.

An example of a suitable regression analysis now follows. The parametrization is updated to include parameters $\varepsilon_{2,1}$ and $\varepsilon_{2,3}$ to allow for fine adjustments of the distances between the cameras, as:

$$C_2=-R^T \times t_2$$

$$P_1=K[R,-R\times(C_2+(d_{2,1}+\varepsilon_{2,1})R_1)]$$

$$P_2=K[R,-R\times C_2]$$

$$P_3=K[R,-R\times(C_2-(d_{2,3}+\varepsilon_{2,3})R_1)]$$

while at the same time adding the checkerboards into the same optimization. The following residuals are optimized over, as a sum of squares:

$$\text{res}_{1x}=(P_i V_l)_x/(P_i V_l)_z-(v_{il})_x/(v_{il})_z$$

$$\text{res}_{1y}=(P_i V_l)_y/(P_i V_l)_z-(v_{il})_y/(v_{il})_z$$

$$\text{res}_{2x}=(P_i T_j U_k)_x/(P_i T_j U_k)_z-(u_{ijk})_x/(u_{ijk})_z$$

$$\text{res}_{2y}=(P_i T_j U_k)_y/(P_i T_j U_k)_z-(u_{ijk})_y/(u_{ijk})_z$$

The optimization is done over the parameters α, R (in Euler angles), $t_2$, $\varepsilon_{2,1}$, $\varepsilon_{2,3}$, $R_j$ (by Euler angles) and $t_j$. e.g. a total of 69 parameters if there are 10 checkerboard orientations j. This final optimization jointly finds a solution where an axiom holds that the camera centre 31 of all three cameras 30a, 30b, and 30c all lie on the straight axis 35, and both the measured 3D points and the checkerboards are projected to the points where they appear in the de-warped and rectified images. Alternatively, the final optimization may jointly find a solution comprising a minimization of an estimated distance of the camera centre 31 of all three cameras 30a, 30b, and 30c from the straight axis, and both the measured 3D points and the checkerboards are projected to the points where they appear in the de-warped and rectified images.

Second, the processing unit 15 determines a set of calibration parameters 150 in dependence on jointly optimized positions 143. The set of calibration parameters 150 can comprise a set of distances between the camera centres 31, a position of the imaging system 10, a rotation of the imaging system 10, a position of the calibration object 60 corresponding to at least one of the calibration object images 110, and a rotation of the calibration object 60 corresponding to at least one of the calibration object images 110.

The step of determining the jointly optimized positions 143 in dependence on the optimized position estimates 142, first rectification parameters 123, and an axiom that each camera centre 31 of the cameras 30 is positioned along the line being a straight axis 35 provides several advantages. Both the calibration object images 110 and the position point images 130 contain important and partially complementary information, so a calibration technique that uses both is particularly advantageous. Data from nearby points (i.e. data from calibration object images 110) are particularly useful for finding intrinsic parameters such as the focal length, principal point, and precise relative positions of the cameras, while data from points further away (i.e. data from position point images 130) are more useful for extrinsic parameters like the rotation and translation of the entire imaging system 10. Adding an explicit parametrization that each camera centre 31 of the cameras 30 is positioned along the line being a straight axis 35, advantageously prevents the method from finding solutions where the cameras are not on a straight line.

Figure 6:
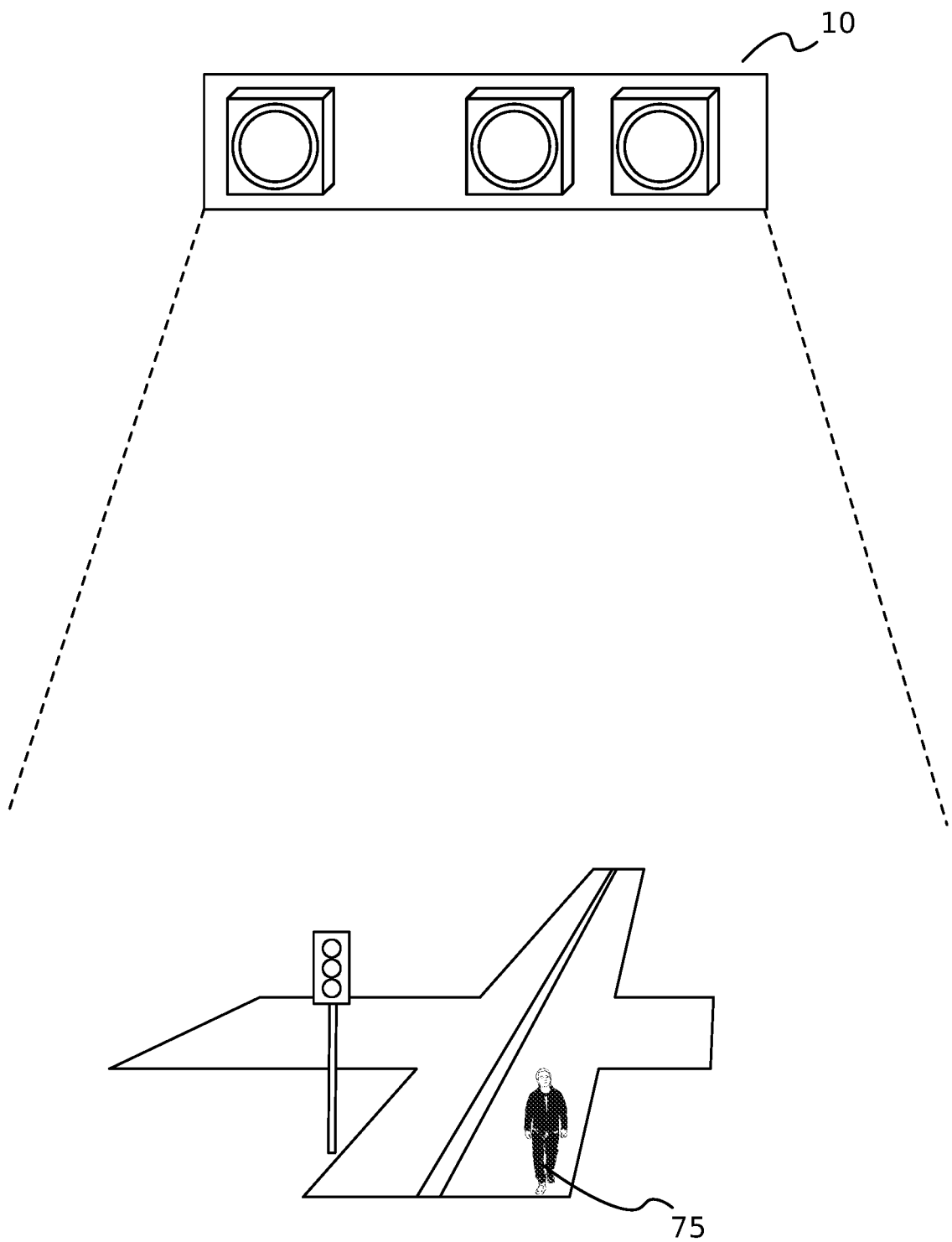
FIG. 6 is diagram of an imaging apparatus and a scene and an object of interest within a field of view of the imaging apparatus according to an aspect of the description.

FIG. 6 is a diagram of the imaging apparatus 10 viewing scene 71 with an object of interest 75 within a field of view of the imaging apparatus 10. Using the set of calibration parameters 150, the imaging system 10 can precisely determine the 3D position of the object of interest 75 within scene 71, i.e. to determine its position in the three Cartesian coordinates x, y, and z.

Figure 7:
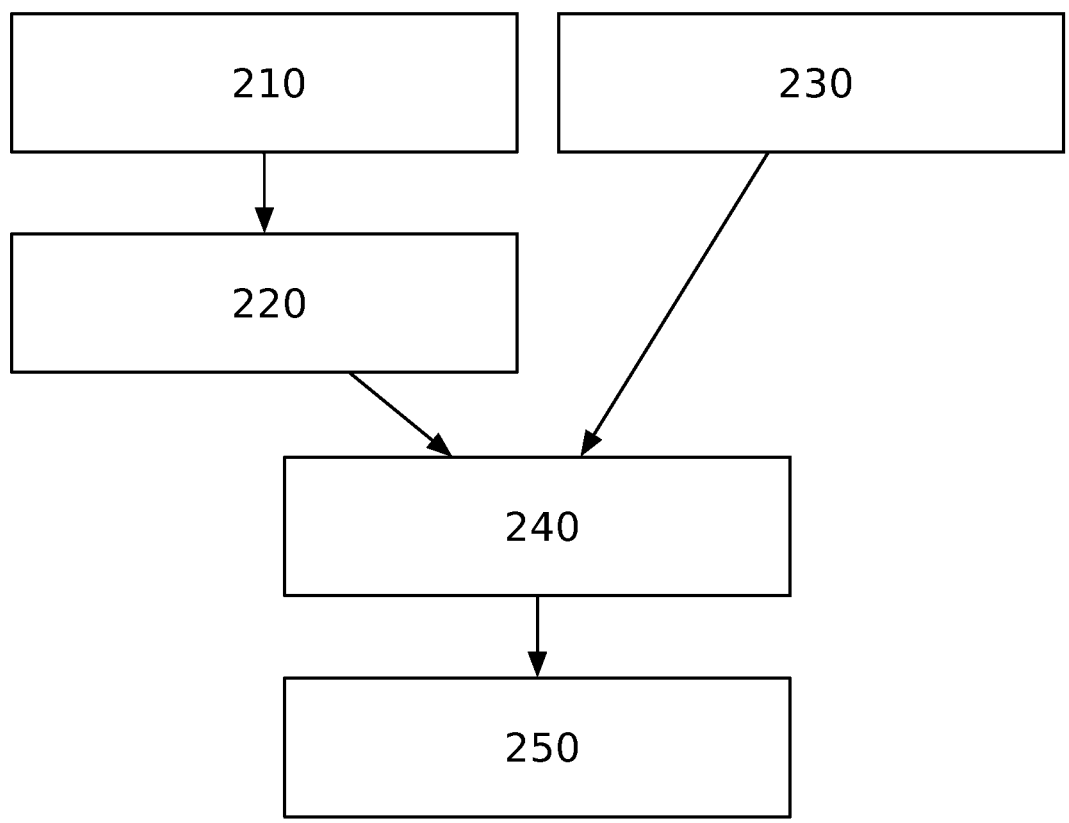
FIG. 7 is a flowchart of the imaging processing method sequence according to another aspect of the description.

While FIG. 2 shows a calibration sequence in which step 210 is performed before step 230, it is understood that the calibration sequence may be performed in alternative orders. E.g. Step 230 may be performed before step 210. FIG. 7 shows a calibration sequence according to another aspect of the description where step 230 is performed at a time independent of step 210.

Figure 8:
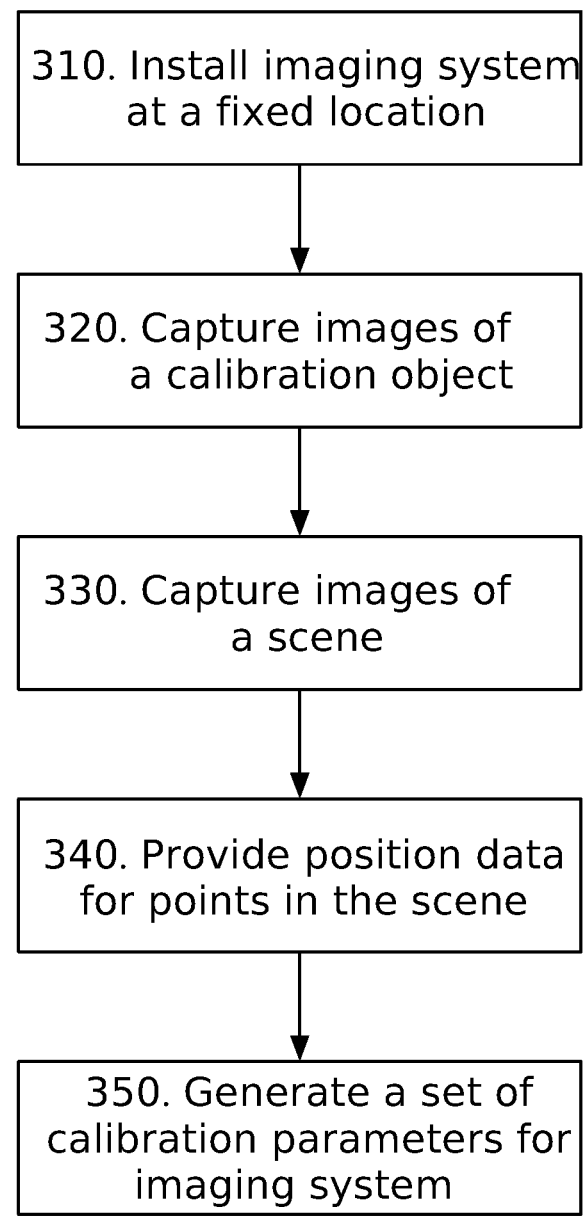
FIG. 8 is a flowchart of the installation and calibration method for an imaging system of an aspect of the description.

FIG. 8 is a flowchart of an installation and calibration method for an imaging system 10 according to an example.

In step 310, the imaging system 10 is installed at a fixed location in a position such that the cameras 30 of imaging system 10 share a common field of view 32 of a scene 71. This step may comprise installation of imaging system 10 by fixing a housing 20 of imaging system 10 to a post, building, support frame, or stationary vehicle. This step may be carried out by hand or in an automated manner, e.g. using a robot. For example, the position may be an elevated position at which the imaging system 10 is configured to monitor a large area. This may be the case in traffic surveillance and/or city surveillance, just to give some examples.

In step 320, the imaging system 10 is controlled by a user or an automated system to capture one or more images of a calibration object 60, wherein the calibration object 60 is located nearby the at least three cameras 30 and in the common field of view 32. Imaging system 10 may be configured to automatically capture one or more images of a calibration object 60 upon detecting that the calibration object 60 is within the common field of view 32. The calibration object 60 may be positioned within the common field of view 32 by hand or in an automated manner, e.g. using a robot.

In step 330, the imaging system 10 is controlled by a user or an automated system to capture one or more images of scene 71. Imaging system 10 may be configured to capture one or more images of a scene 71 upon detecting that the calibration object 60 is no longer within the common field of view 32 or at any time that the calibration object 60 is not within the common field of view 32. As described above, the scene 71 comprises a set of objects at a distance of typically at least 2 metres from imaging system 10. Step 330 may occur after step 320, before step 320, or where the calibration object 60 does not obscure scene 71, in parallel with step 320.

In step 340, the imaging system 10 is provided with a set of position data 72 corresponding to the set of scene position points 70 in the scene 71. The scene position points 70 comprise 3D positions measured using an electronic/optical instrument used for surveying and building construction, such as a total station. The position data 72 may be uploaded to imaging system 10 via a direct interface, a wired or wireless network, or any other means to transmit electronic data.

In step 350, imaging system 10 generates a set of calibration parameters 150 in dependence on the images of the calibration object 60, images of the scene 71, and the set of position data 72.

As the calibration object 60 may be relatively small, e.g. small enough to be hand held, this method advantageously allows the smaller calibration object 60 to be used for close calibration. Where the camera is arranged up high, only the small calibration object 60 needs to be lifted up high to be brought close to the imaging system 10. In the meantime, the more sensitive position data 72 can be taken at stable positions where a measurement device can be held still for several seconds, like on the ground or on a wall.

In some embodiments, the imaging system 10 is configured to be moveable in one or more directions, e.g. in a pan direction and/or a tilt direction. In such embodiments, the described calibration process may be performed for each one out of a plurality of pan and/or tilt positions of the imaging system 10. The calibration parameters 150 obtained may be stored and associated with the pan and/or tilt position of the imaging system 10. When the imaging system 10 is in operation, e.g. in a traffic or city surveillance operation, the calibration parameters 150 associated with the pan and/or tilt positions being the same or most closely being the same as the operational pan and/or tilt positions of the imaging system 10 will be used in e.g. depth estimations.

It should be understood that one or more of the steps performed using the calibration object 60, e.g. the checkerboard, may be performed in a laboratory or at a manufacturing site when assembling the imaging system 10, while one or more of the steps using the distant set of objects of the scene 71 may be performed at the installation site, i.e. the operation site, of the imaging system 10. Thus, the steps of the described calibration process do not have to be performed all at the same location.

The invention claimed is:

1. A method of calibrating an imaging system, the imaging system comprising at least three cameras having a common field of view, wherein each of the at least three cameras has a camera centre, and wherein the camera centres are positioned along a line, the method comprising:
   first imaging a calibration object with the at least three cameras to generate a set of calibration object images, wherein the calibration object is located nearby the at least three cameras and in the common field of view,
   generating a set of first parameters by processing the set of calibration object images, wherein the set of first parameters comprises a set of intrinsic parameters for the at least three cameras,
   second imaging, separate from the first imaging, at a distance further than the first imaging location of a scene excluding the calibration object comprising a set of distant scene position points separate from the calibration object with the at least three cameras to generate a set of position point images separate from the set of calibration object images,
   receiving a set of position data describing 3D positions of the scene position points,
   generating a set of second parameters by processing the set of position point images in dependence on the set of intrinsic parameters and the set of position data, and
   generating a set of calibration parameters in dependence on the set of first parameters and the set of second parameters, wherein the set of calibration parameters comprises jointly optimized positions comprising a position and a rotation for each of the at least three cameras wherein the jointly optimized positions are determined according to a regression analysis in dependence on the set of first parameters and the set of second parameters.

2. The method according to claim 1, wherein the set of calibration parameters is generated in dependence on the set of first parameters, the set of second parameters, and an axiom that each camera centre is positioned along the line being a straight axis.

3. The method according to claim 2, wherein the set of calibration parameters is generated in dependence on the set of first parameters, the set of second parameters, and a minimization of a distance of each camera centre from the straight axis.

4. The method according to claim 1, wherein a spacing between adjacent pairs of the camera centres varies.

5. The method according to claim 1, wherein the set of calibration parameters comprises at least one of:
  a set of distances between the camera centres,
  a position of the calibration object corresponding to at least one of the calibration object images,
  a rotation of the calibration object corresponding to at least one of the calibration object images.

6. The method according to claim 1, wherein the step of generating the set of first parameters comprises determining a set of radial distortion parameters or tangential distortion parameters from the calibration object images.

7. The method according to claim 1, wherein the step of generating the set of first parameters comprises determining a set of rectification parameters for cameras from the calibration object images.

8. The method according to claim 1, wherein the step of generating the set of second parameters comprises determining a set of initial positions estimates for the at least three cameras.

9. An imaging system comprising:
  at least three cameras having a common field of view, wherein each of the at least three cameras having a camera centre, and wherein the camera centres are positioned along a line,
  the at least three cameras being configured to:
    first image a calibration object to generate a set of calibration object images, wherein the calibration object is located nearby the at least three cameras and in the common field of view, and
    second image, separate from the first image, at a distance further than the first imaging location of a scene excluding the calibration object comprising a set of distant scene position points separate from the calibration object to generate a set of position point images separate from the set of calibration object images, and
  a processing unit configured to:
    generate a set of first parameters by processing the set of calibration object images, wherein the set of first parameters comprises a set of intrinsic parameters for the at least three cameras,
    receive a set of position data describing 3D positions of the scene position points,
    generate a set of second parameters by processing the set of position point images using the set of intrinsic parameters and the set of position data, and
    generate a set of calibration parameters in dependence on the set of calibration object images and the set of position point images, wherein the set of calibration parameters comprises jointly optimized positions comprising a position and a rotation for each of the at least three cameras, wherein the jointly optimized positions are determined according to a regression analysis in dependence on the set of first parameters and the set of second parameters.

10. The imaging system according to claim 9, wherein the imaging system further comprises a housing and wherein the at least three cameras are located in the housing.

* * * * *